United States Patent Office 3,316,107
Patented Apr. 25, 1967

3,316,107
FIRED CHROME-MAGNESITE REFRACTORIES
Peter H. Havranek, Pittsburgh, Pa., assignor to Harbison-Walker Refractories Company, Pittsburgh, Pa., a corporation of Pennsylvania
No Drawing. Filed July 8, 1965, Ser. No. 470,585
The portion of the term of the patent subsequent to July 13, 1983, has been disclaimed
5 Claims. (Cl. 106—59)

The present invention is a continuation-in-part of application Ser. No. 270,699, filed Apr. 4, 1963, by Ben Davies and myself, now United States Patent 3,194,672 which application is owned by the same assignee.

This invention relates to improved, fired, chrome ore-magnesite refractory shapes. In another aspect, this invention relates to improved, fired, chrome ore-magnesite refractory structures, chrome ore-magnesite refractory shapes for fabrication of such structures, and methods of fabrication of the shapes.

Refractories made from a mixture of dead burned magnesia and chrome ore hold an important place in industry. These refractories are generally divided into those which have a predominance of chrome ore and those having a predominance of magnesia. This invention is particularly concerned with those having a predominance of chrome ore and to the refractory structures which they are used to fabricate. These refractories are referred to in the art as chrome-magnesite refractories, and will thus be designated in the remainder of this specification.

The term "magnesite" is actually a misnomer since "magnesite" is actually $MgCO_3$. However, in the refractories art, the term is used synonymously with "magnesia," which is MgO. In this specification, "magnesite" will be given the meaning common in the refractories art.

There are various commercial versions of chrome-magnesite refractories. One type is chemically bonded without any burning or firing treatment. Others are burned. The burned refractories are divided into two groups which generally are defined as (1) silicate-bonded and (2) direct-bonded. The silicate-bonded refractories are characterized by silicate (forsterite, monticellite, or others) filming about or between the chrome ore and magnesite grains, which filming in a sense "glues" them together. In the direct-bonded type of burned refractory, the silicate filming has been minimized or substantially eliminated, so there is a large degree of direct attachment between adjacent chrome ore and magnesite grains. This invention relates to refractories which are primarily silicate-bonded. However, some degree of direct particle-to-particle attachment is present.

Both the chrome-magnesite refractories (which contain a predominance of chrome ore) and the magnesite-chrome refractories (which contain a predominance of magnesite) have their relative advantages and disadvantages. Chrome-magnesite refractories are less expensive because the raw material chrome ore is less expensive than high-purity magnesite. Magnesite-chrome refractories generally are considered more refractory; that is, they will sustain greater compressive loads at elevated temperatures. Magnesite-chrome refractories also have greater volume stability under cyclic temperature or atmospheric conditions since chrome ores contain oxides which readily release oxygen (are reduced) upon heating and pick up oxygen (are oxidized) upon cooling or upon changing the atmosphere.

Chrome-magnesite refractories, on the other hand, are generally considered more resistant to thermal shock; that is, they do not end to crack or disintegrate easily when there is a rapid change in temperature. Both types of refractories have good resistance to basic slags. Chrome-magnesite refractories generally are somewhat better in resistance to those slags found in the nonferrous industries, whereas the magnesite-chrome refractories are generally more resistant to those slags founds in the ferrous industries.

Chrome-magnesite refractories generally have been considered to have better intermediate temperature strength (for example, modulus of rupture at 2300° F. and 2600° F.) than magnesite-chrome refractories. For this reason, a considerable amount of work has been performed to improve the intermediate temperature strengths of magnesite-chrome refractories, but very little work has been performed on the chrome-magnesite refractories. Magnesite-chrome refractories generally are considered to have better high-temperature strength as measured by resistance to a 25 p.s.i. compressive load at, for example, 3000° F. In the past, whenever the high-temperature strength of chrome-magnesite refractories was insufficient, they were improved merely by reducing the ratio of chrome ore to magnesite. However, then some of the advantages of the higher chrome ore content were lost. Alternately, the brick were fired at extremely high temperatures, for example, in excess of 3000° F. While this will improve both intermediate and high-temperature strength of chrome-magnesite and magnesite-chrome refractories, it increases the firing costs. Besides increased firing costs, due to increase in fuel consumption, many brick are lost due to sticking and warping during the firing process.

It has long been desired to manufacture a chrome-magnesite refractory which will have improved high-temperature strength as measured by the load test, and which will have improved intermediate temperature strength as measured by modulus of rupture at 2300° F. and 2600° F. without losing the advantages of higher chrome-magnesite ratios and without firing above 3000° F.

In the copending application, a method of improving the hot strength of magnesite-chrome brick by adding 1–5% titania under controlled conditions was taught. In that application, it also is taught that titania additions to chrome-magnesite brick do not improve intermediate and high-temperature strength.

Additions of $TiO_2$ to chrome-magnesite brick were investigated by Richardson et al.,[1] but with little success. Richardson made additions of 2 and 5% $TiO_2$ to 70:30 Philippine chrome ore-magnesite brick. Their brick mixes were sized so that the magnesite was minus 30 mesh and the chrome ore primarily held on 10 mesh, with about 10% passing 30 mesh. These two mixes, along with a standard without $TiO_2$, were burned at 2730° F. (1500° C.), 2910° F. (1600° C.) and 3090° F. (1700° C.). The standard and the mix containing 5% titania, when burned at 3090° F., passed the British refractories-under-load test (R-U-L), which consists of subjecting the refractories to a 28 p.s.i compressive load at 2900° F. for

[1] Richardson et al., Transactions of the British Ceramic Society 59, p. 496 (1960).

one hour. (The mix containing 2% $TiO_2$ was not tested.) This is an example of obtaining increased intermediate and high-temperature strength by burning chrome-magnesite brick to extremely high temperatures.

When burning at the lower temperatures, only the mix containing 5% $TiO_2$ passed the R-U-L test. However, this mix had a low bulk density when fired to 2900° F. due to excessive burning expansion. This low bulk density is considered by me very undesirable because, as a general rule, in the refractories industry denser brick are stronger and more resistant to chemical or slag attack. Therefore, Richardson et al. were unable to improve the high-temperature strength of chrome-magnesite refractories by making $TiO_2$ additions and burning at normal brickmaking temperatures (for example, 2900° F.) without a considerable loss in density.

It is, therefore, an object of this invention to provide a burned chrome-magnesite refractory with increased intermediate and high-temperature strengths which can be burned at normal firing temperatures, which brick have good density (i.e., at least 190 p.c.f.) and which do not excessively deform in firing.

It is a further object of this invention to provide a refractory chrome-magnesite batch which, when burned to about 2800 or 2900° F., provides a chrome-magnesite brick with increased intermediate and high-temperature strength, which brick have good density.

Briefly, according to one aspect of this invention, a batch is prepared in which the chrome-magnesite weight ratio is between 50:50 and 70:30, and from 1–3%, by weight, minus 325 mesh titania or a compound yielding $TiO_2$ when brick made from the batch are fired. The chrome ore is substantially all minus 3½ mesh plus 65 mesh. At least about 20%, by weight, of the batch passing 28 mesh is chrome ore. Substantially all the magnesite in minus 28 mesh. The silica content of the chrome ores and magnesite must be such that the batch and final product contains less than 3%, based on an oxide analysis by weight. This batch is tempered with water and a binder, for example, lignin liquor, to provide pressing consistency. The batch is shaped into brick, for example, by pressing at 8000 p.s.i. and dried, for example, at 250° F., for five hours. The dried brick are burned at about 2800° F. or 2900° F. for about ten hours. The resulting burned chrome-magnesite refractory shapes have improved intermediate and high-temperature strengths, a density over 190 c.c.f., and are not excessively deformed.

The following examples are given by way of explanation and not by way of limitation in order to more clearly appraise those skilled in the art of the practice of this invention.

*Examples I, II, and III*

Examples I, II, and III were 60:40 chrome ore-magnesite brick made from the batches indicated in Table I.

TABLE I

| Example No. | I | II | III |
|---|---|---|---|
| Base Mix, percent: | | | |
| Philippine Chrome Ore, −3½+6 mesh | 30 | 30 | 30 |
| Philippine Chrome Ore Concentrates, −6+28 mesh | 6 | 6 | 6 |
| Philippine Chrome Ore Concentrates, −28 mesh to fines. Predominant proportion is +65 mesh | 24 | 24 | 24 |
| Magnesite, −10+28 mesh | 10 | 10 | 10 |
| Magnesite Ball Milled Fines | 30 | 30 | 30 |
| Additions | None | (¹) | (²) |

¹ 1% $TiO_2$.
² 1% Ilmenite.

The batches of Examples I, II, and III were mixed in a muller-type mixer and tempered with about 4.5% lignin liquor which acts as a room-temperature bond. The batches were pressed into brick at about 8000 p.s.i.

After pressing, the brick were dried at about 250° F. for five hours. The resulting brick were burned at 2900° F. in a laboratory kiln. The properties of the brick, after burning, are given in Table II.

TABLE II

| Example No. | I | II | III |
|---|---|---|---|
| | 2,900° F. Laboratory Burn | | |
| Bulk Density, p.c.f. (Av. 15) | 190 | 190 | 190 |
| Modulus of Rupture, p.s.i.: | | | |
| At Room Temperature (Av. 3) | 840 | 900 | 1,040 |
| At 2,300° F. (Hold Time at Temp. prior to loading, 5 hrs.) (Av. 3) | 1,020 | 1,340 | 1,240 |
| At 2,600° F. (Hold Time at Temp. prior to loading, 5 hrs.) (Av. 3) | 410 | 630 | 510 |
| Apparent Porosity (Av. 3), percent | 20.8 | 20.7 | 20.7 |

Table II establishes that refractories brick made according to the teachings of this invention have improved intermediate temperature strength. Example I, without the titania or ilmenite addition, had properties that would be expected for chrome-magnesite brick. Examples II and III, with the titania or ilmenite additions, have improved intermediate temperature strength (as measured by modulus of rupture at 2300 and 2600° F.) without a loss in density. It will be recalled that Richardson et al. made additions of 5% before improvement in hot strength was recognized, and then only at a considerable loss in density.

Examples I, II, and III were also burned at 2820° F. in a laboratory kiln. The properties of these examples are given in Table III. The titania or ilmenite additions increased the intermediate temperature strength of the brick, but the hot strengths were generally lower than those obtained in brick burned to 2900° F.

TABLE III

| Example No. | I | II | III |
|---|---|---|---|
| | 2,820° F. Laboratory Burn | | |
| Bulk Density, p.c.f. (Av. 15) | 190 | 190 | 190 |
| Modulus of Rupture, p.s.i.: | | | |
| At Room Temperature (Av. 3) | 530 | 740 | 740 |
| At 2,300° F. (Hold Time at Temp. prior to loading, 5 hrs.) (Av. 3) | 840 | 1,090 | 1,080 |
| At 2,600° F. (Hold Time at Temp. prior to loading, 5 hrs.) (Av. 3) | 160 | 300 | 270 |
| Apparent Porosity, percent | 20.9 | 20.8 | 21.3 |

*Examples IV and V*

Example IV brick were made from a batch identical to Example II, but mixed, pressed, dried, and burned in a brick plant under actual production conditions. The brick were fired to 2900° F. in a tunnel kiln. The properties of the brick of Example IV are given in Table IV.

Example V reports on 60:40 chrome ore-magnesite brick without titania additions (similar to Example I) made in a brick plant under conditions similar to that of Example IV. The properties of these brick are also given in Table IV.

TABLE IV

| Example No. | IV | V |
|---|---|---|
| Bulk Density, p.c.f. (Av. 15) | 193 | 187 |
| Modulus of Rupture, p.s.i.: | | |
| At Room Temperature (Av. 3) | 1,140 | 790 |
| At 2,300° F. (Hold Time Prior To Loading, 5 Hrs.) (Av. 3) | 1,770 | 980 |
| At 2,600° F. (Hold Time Prior To Loading, 5 Hrs.) (Av. 3) | 260 | (¹) |
| Apparent Porosity (Av. 3), percent | 17.9 | 19.7 |
| Load Test, 25 p.s.i. (Av. 1): | | |
| Linear Subsidence at 3,300° F., percent | 6.2 | |
| Temperature of Failure, ° F | | 3,080 |

¹ Not tested.

Table IV further establishes there is considerable advantage in making titania additions to chrome-magnesite brick. The intermediate temperature strength, as measured by modulus of rupture at 2300 or 2600° F., is considerably increased. But also, the high-temperature strength, as measured by the load test, is also increased. This is contrary to the findings of the prior art, and certainly an advance thereover. This increase in strenth was made without a loss in bulk density due to burning expansion. Further, the porosity was decreased by the $TiO_2$ addition. Example IV is the best mode now known to the inventor for the practice of this invention.

The magnesite used in the examples were of the high-purity synthetic type; that is, with less than 3% impurities. However, dead burned magnesites with less than 5% impurities can be used in the practice of this invention. This invention may be practiced with other refractory grade chrome ores, such as Transvaal or Turkish chrome ore. The chemical analyses of the magnesite and chrome ores used in the examples are given in Table V.

TABLE V

|  | Philippine Chrome Ore, Percent | Philippine Chrome Ore Concentrates, Percent | Dead Burned Magnesite, Percent |
| --- | --- | --- | --- |
| $SiO_2$ | 5.5 | 2.3 | 0.7 |
| $Al_2O_3$ | 29.4 | 30.0 | 0.3 |
| FeO | 12.6 | 12.6 | 0.3 |
| $Cr_2O_3$ | 32.1 | 32.0 |  |
| CaO | 0.6 | 0.6 | 0.7 |
| MgO | 18.8 | 19.0 | 98.0 |
| Loss on Ignition | 1.0 | 2.5 |  |

The titania additions to the chrome ore-magnesite batch, used in the practice of this invention, are added as substantially all −325 mesh material. Titania ($TiO_2$), itself, may be added as can compounds of titania; for example, one of the following spinels or mixtures thereof:

Magnesium titanates—($MgO \cdot TiO_2$, $2MgO \cdot TiO_2$, $MgO \cdot 2TiO_2$)
Cobalt titanate—($2CoO \cdot TiO_2$)
Manganese titanate—($2MnO \cdot TiO_2$)
Zinc titanates—($2ZnO \cdot TiO_2$)
Iron titanates—($2FeO \cdot TiO_2$)

Organic or inorganic salts of titanium that decompose to yield $TiO_2$, such as $TiCl_4$, $TiI_4$, $TiS_2$, etc., may also be added.

While not fully understood, it appears the titania addition promotes an increased amount of direct chrome-magnesite attachment. For this attachment to take place, it is critical that a substantial amount of chrome ore be in the finer fraction of the batch. Richardson et al. placed the chrome ore of their mixes substantially all in the coarse fraction of their batches, which might explain their failure to increase intermediate and high-temperature strength with small titania additions. Furthermore, it is necessary that high-purity magnesites and chrome ores be used for the practice of this invention to assure no more than about 3% silica is present in the refractory brick after burning. Maintaining the silica content low apparently aids in the direct attachment of chrome to magnesite. Richardson et al. did not divulge the purity of the magnesites they used. But if they did use higher silica-containing magnesite, this also might have contributed to their failing. It is not necessary that a large amount of titania be present to achieve the increased intermediate and high-temperature strengths of this invention. Example III, with 1% ilmenite added to its batch, contained only 0.62% titania after burning. Larger amounts of titania tend to increase the burning expansion of chrome-magnesite excessively, as was demonstrated by Richardson et al. Therefore, no more than about 3% of $TiO_2$ should be present.

Having thus described the invention in detail and with sufficient particularity as to enable those skilled in the art to practice it, what is desired to have protected by Letters Patent is set forth in the following claims.

I claim:
1. A burned chrome-magnesite refractory made from a refractory sized graded brickmaking batch, said batch consisting of chrome ore and magnesite in a weight ratio between 50:50 and 70:30 and a compound of titanium yielding from 0.5 to 3% $TiO_2$, there being no more than about 3.0%, by weight, $SiO_2$ in the total batch, substantially all said magnesite being −28 mesh, the chrome ore being substantially all −3½+65 mesh, at least about 20% of the batch, by weight, being minus 28 mesh chrome ore, said refractory being fired at a temperature of at least 2800° F.

2. The brick of claim 1 in which the batch contains 0.5 to 3.0% −325 mesh titania.

3. The brick of claim 1 in which the brick is fired at about 2900° F.

4. A method of making a burned chrome-magnesite brick consisting of the steps of fabricating a refractory size graded brickmaking batch, said batch consisting of chrome ore and magnesite in a weight ratio between 50:50 and 70:30 and a compound of titanium yielding from 0.5 to 3% $TiO_2$, there being no more than about 3.0% $SiO_2$, by weight, in the total batch, said magnesite being substantially all −28 mesh, said chrome ore being substantially all −3½+65 mesh, at least about 20% of the batch by weight being minus 28 mesh chrome ore, tempering said batch, forming brick from said batch, firing said brick to obtain a ceramically bonded chrome-magnesite brick.

5. The method of claim 4 in which said brick are burned at a temperature in the range of 2800 to 2900° F.

References Cited by the Examiner
UNITED STATES PATENTS

| 2,316,228 | 4/1943 | Erdmann | 106—59 |
| 3,194,672 | 7/1965 | Davies et al. | 106—59 |

TOBIAS E. LEVOW, *Primary Examiner.*

J. E. POPER, *Assistant Examiner.*